Nov. 1, 1927.

W. MEYER

BATTERY CASE

Filed Dec. 10, 1926

Witnesses:
Harry C. White
William P. Kilroy

Inventor
William Meyer
By Brown Boucher Dennis
Attys.

Nov. 1, 1927.

W. MEYER 1,647,141

BATTERY CASE

Filed Dec. 10, 1926

Witnesses:
William P. Kilroy
Harry E. White

Inventor:
William Meyer
By Brown, Boettcher & Dienner
Attys

Patented Nov. 1, 1927.

1,647,141

UNITED STATES PATENT OFFICE.

WILLIAM MEYER, OF CHICAGO, ILLINOIS.

BATTERY CASE.

Application filed December 10, 1926. Serial No. 153,897.

This invention relates to an improved battery case and more particularly to a novel arrangement and mounting of the cells therein.

The present invention has particular utility in connection with the faradic and galvanic circuits for electrotherapeutic uses, but the invention may of course be employed wherever found desirable and is therefore not limited to any particular use or purpose.

At present in removing and inserting the cells in devices of this sort, binding post screws must be loosened and the connecting wires are frequently confused. Where there are a number of cells the difficulties and tediousness of the task are increased and I find that the average user and even the ordinary electrician, are not usually capable of correctly replacing the cells. It has therefore become practically necessary to send devices of this sort back to the factory to have them equipped with new cells. This involves great expense to the user and when the batteries come back from the factory I find that they often have a number of the binding posts and flexible connecting wires corroded, frequently to such an extent that they have had to be replaced.

The object of my invention is to provide a device in which the cells may be conveniently replaced by the ordinary user without disturbing the wiring or circuit connections, and to eliminate the necessity of unscrewing binding post screws and the like, in removing and replacing the cells, particularly the cells for use for galvanism in devices of this sort.

Another object is to provide a generally improved and simplified construction of the device and a generally improved and simplified mounting and arrangement of the cells, and a construction mounting and arrangement that may be economically produced and conveniently embodied.

According to my invention I use cells of the quick detachable type, such as now commonly used in flash light batteries. I provide a pair of contacts and the battery is mounted between and supported by these contacts with its terminals in quick detachable contact therewith. To replace a cell it is simply slipped from position between the contacts and another cell may be slipped into place therebetween by the user without difficulty and without loosening binding post screws or disturbing the wiring or connections. The dual function imparted to the contact by supporting the cells thereby eliminates parts and decreases the cost.

The invention is illustrated in the accompanying drawings in which—

Figure 1:
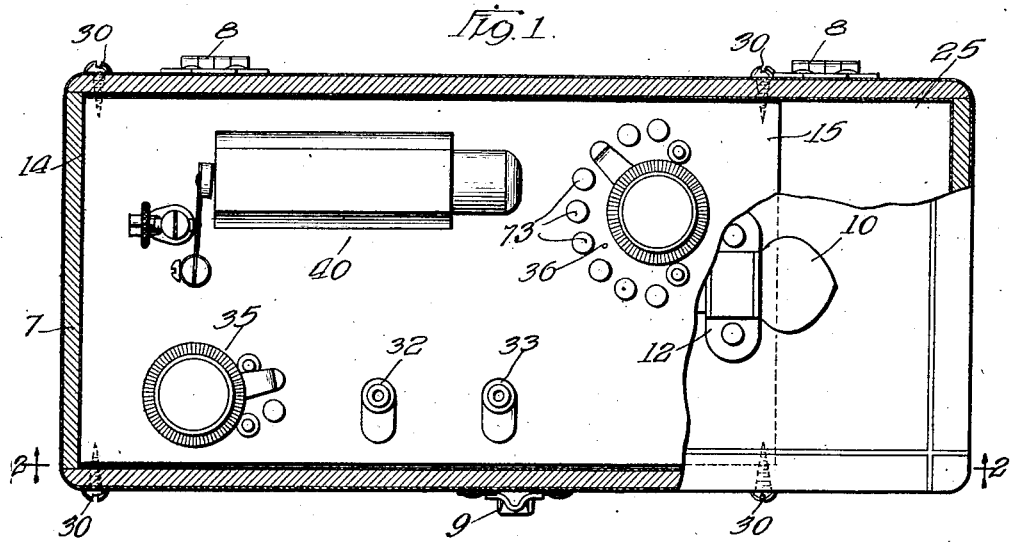
Fig. 1 is a horizontal section taken on the line 1—1 of Fig. 2, through a battery case embodying the invention.
Figure 2:
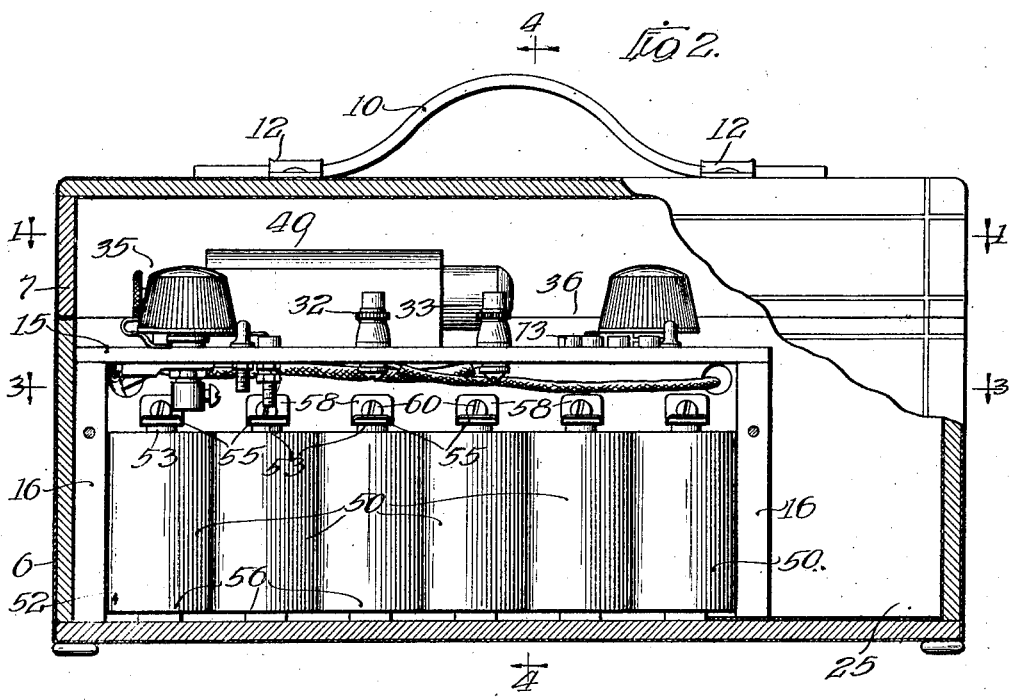
Fig. 2 is a longitudinal section taken on the line 2—2 of Fig. 1.
Figure 3:
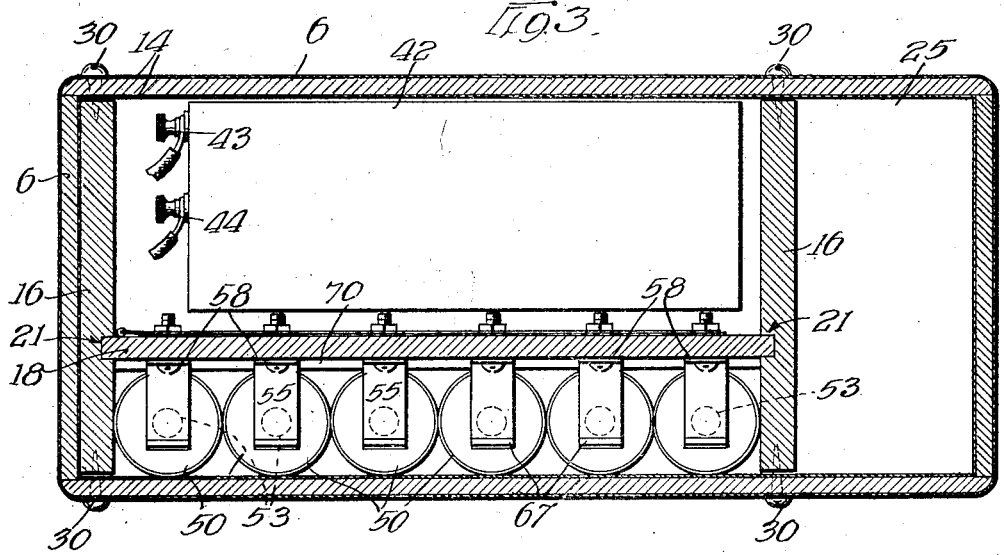
Fig. 3 is the horizontal section taken on the line 3—3 of Fig. 2.
Figure 4:
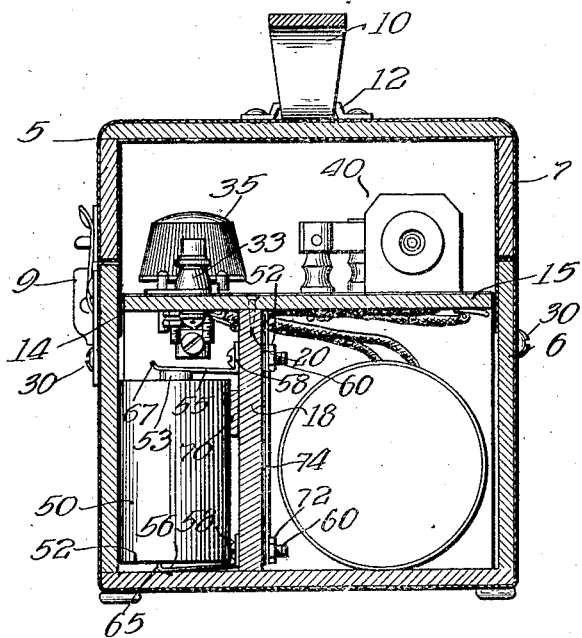
Fig. 4 is the transverse vertical section taken on the line 4—4 of Fig. 2.

Referring to the drawings the case designated generally at 5 comprises a box or lower part 6 having an open top closed by a cover 7. The cover 7 may be suitably hinged at 8, along its longitudinal rear edge to the upper edge of the rear wall of the lower part 6, and a latch 9 may be provided for latching the cover 7 in closed position upon the lower part 6.

The top wall of the cover 7 may be provided with a suitable carrying handle 10 which may comprise a flexible strap suitably attached adjacent its opposite end to the top of the cover 7, and by means of fasteners 12. The walls of the cover 7 and the lower case part 6 may be provided with a covering 14. This covering may simulate leather, for example, or it may be otherwise to give the case any desired finished appearance.

Mounted horizontally within the case part 6, and adjacent the open top thereof with one end abutting one end wall of the case part 6, and the other end spaced from the opposite end wall is a horizontal shelf or panel 15. This panel 15 is of wood or any other suitable insulating material and in the case of wood especially the upper surface of the panel 15 may be enameled or otherwise suitably finished.

Underlying the panel 15 and disposed transversely through the case, with one along each of the opposite ends of the panel 15, are a pair of end pieces 16, 16 which may be formed of wood and also underlying the panel 15 and extending longitudinally between the end pieces 16, 16 is a vertical longitudinal partition 18 which may also be of wood. The panel 15 overlies the upper edges of the partition 18 and end pieces 16 and is supported within the case thereby, and is preferably attached thereto as at 20 to constitute a unitary supporting frame and panel mounted in the lower part 6 of the case and spaced from one end to provide a space 25. The ends of the partition 18 may be mortised into the end pieces 16 as at 21, 21.

The unitary supporting frame and panel may be secured within the case by screw 30 or other fastening devices passing through the longitudinal walls of the bottom of part 6 and into the end pieces 16.

The particular device shown is for supplying faradic and galvanic current for electrotherapeutic uses and the like. The output terminals 32 and 33 from which the faradic and galvanic current is taken as desired, are mounted upon the panel 15. Also mounted upon the panel 15 are a pair of switches 35 and 36 for opening and closing the circuit and for selectively supplying faradic and galvanic current and controlling or increasing and decreasing the galvanic current as desired.

The faradic coil 40 is also mounted upon panel 15 and for operating this coil a 1½ volt 30 to 35 ampere dry cell battery 42, for example, may be employed. This cell 42 is laid longitudinally along one side of the partition 18 and in horizontal position in the case. The cell 42 is provided with the usual terminals 43 and 44 and the circuit connections and manner of controlling the circuits and operating the device are the ordinary circuit connections control and operation employed in devices of this sort as well understood in the art or these may be varied as desired and will therefore not be described in detail here. They form no part of the present invention.

For galvanism I employ a plurality of relatively small cells 50 of the quick detachable type such as used in flash light batteries and the like. While in the particular embodiment shown, six of these cells 50 are used in series for galvanism, it is to be understood that the particular number and purpose of these cells may vary, as desired. Merely as further illustrative of the particular embodiment of the invention shown, these cells 50 may be of the usual 1½ volt ⅔ ampere type. The bottom 52 of the zinc case of each cell 50 forms one terminal of each cell 50 and the central upstanding post 53 forms the other terminal contact of each cell.

For supporting and electrically connecting the cells 50 into the desired circuit, I employ a pair of contact arms 55 and 56 for each cell 50. The upper contact 55 of each pair of these contacts overlies the lower contact 56 vertically and the inner ends of the upper and lower contacts are turned at right angles at 58 and fastened by means of screws 60 to the partition 18, which partition thereby supports the upper and lower contact arms 55 and 56 for the several cells.

With the contacts 55 and 56 so mounted the outstanding cell supporting the contact making arms thereof, extend generally horizontally from and at substantially right angles to the supporting partition 18. These arms are preferably of sufficient springiness to normally contract or converge sufficiently so that the space between them is slightly less than the longitudinal or vertical distance from the bottoms 52 of the cells 50 to the upper ends of the central contact posts 53.

The outer ends of the lower contact 56 are preferably turned up at 65 to make firm mechanical and electrical contact with the bottoms 52 of the respective cells, and the outer ends of the upper contact 55 are preferably inclined outwardly and upwardly at 67, so that by placing the bottom 52 of the cell on the upstanding outer end of the lower contact 56 and bringing the post 53 into co-operation with the inclined outer end 67 of the upper contact 55, the cell 50 may be conveniently slipped or sprung between the contacts 55 and 56, which spring apart by the insertion of the cell and are tensioned by the spreading thereof to hold the cell mechanically between the contacts and firmly against displacement, and the contacts in firm electrical contact with the terminals 52 and 53 of the cell, thereby connecting it electrically and mechanically between the contacts 55 and 56. Extending longitudinally along the partition 18 and suitably secured thereto is a strip 70 which co-operates with the backs of the cells 50 to prevent interference of the screws 60 for the lower contacts 56 with the cells and to hold the cells in their proper vertical position upon one side of the partition 18.

To replace the cells 50, the frame and the panel unit is simply lifted from the case and the cells 50 are then simply slipped from position between the outstanding arms of the contacts 55 and 56 and other cells may be slipped into position between the contacts 55 and 56 by the ordinary user, without difficulty and without loosening binding post screws or disturbing the wiring or connections. The contacts 55 and 56 perform the dual function of supporting the cells 50 and connecting them electrically into the desired circuit and the necessity of returning the device to the factory for replacement is eliminated.

Nuts 72 on the screws 16 may form binding posts and the cells 50 may be connected electrically in series and to the contact points 73 of the switch 36 by conductors 74.

I claim:

1. In a device of the class described, the combination of a case, a cover for said case, a vertical longitudinally extending partition dividing the interior of the case into a pair of longitudinal compartments, a relatively large dry cell battery arranged in one of said compartments with its longitudinal dimension disposed horizontally and extending longitudinally of the case, the walls of said compartments closely surrounding said battery to limit displacement of the same within the case, a plurality of relatively small dry cell batteries each of a length substantially equal to the diameter of said first battery, and a pair of vertically aligned spring contacts mounted on the opposite side of said partition and having spring arms for supporting said relatively small batteries in said other compartment with their longitudinal dimensions arranged vertically and at right angles to the longitudnal dimension of said first battery.

2. In a device of the class described, the combination of a case, a cover for said case, a vertical longitudinally extending partition dividing the interior of the case into a pair of longitudinal compartments, a relatively large dry cell battery arranged in one of said compartments with its longitudinal dimension disposed horizontally and extending longitudinally of the case, the walls of said compartments closely surrounding said battery to limit displacement of the same within the case, a plurality of relatively small dry cell batteries each of a length substantially equal to the diameter of said first battery, and a pair of vertically aligned spring contacts mounted on the opposite side of said partition and having spring arms for supporting said relatively small batteries in said other compartment with their longitudinal dimensions arranged vertically and at right angles to the longitudinal dimension of said first battery, said spring contacts having angular legs fastened to said vertical partition and extension arms and the mounting of said relatively small batteries between the extension arms of said contacts providing quick detachable circuit connections for removing and inserting said relatively small batteries without destroying the wiring connections.

3. In combination, a battery case having a side wall, an internal vertical partition extending longitudinally and parallel with said side wall, a plurality of spring contacts attached in vertically aligned pairs on the side of said partition adjacent said side wall, and a plurality of relatively small dry cell batteries supported vertically in a longitudinally aligned row and with their sides in engagement one between each pair of said contacts and held against displacement therefrom in the direction of the length of the case by the engagement therebetween, said cells fitting relatively closely between said partition and said side wall and confined against transverse displacement from said contacts by said partition and side wall.

4. In combination, a case having a bottom wall, a vertical support overlying said bottom wall, a spring contact clip having an angular leg fastened to said support and extending upwardly and away from said base, an outwardly extending contact arm, a second contact clip spaced above and aligned vertically with said first clip, said second clip having an angular leg fastened to the support, an outwardly extending contact arm, a relatively small dry cell battery supported between and having quick detachable contact with the extending arms of said contact clips, and shoulder means extending from said support and cooperating with the side of the battery near its upper end and spacing the battery from the support to receive the angular leg of the lower clip between the battery and the support.

In witness whereof, I hereunto subscribe my name this 8th day of December, 1926.

WILLIAM MEYER.